Figure 1:
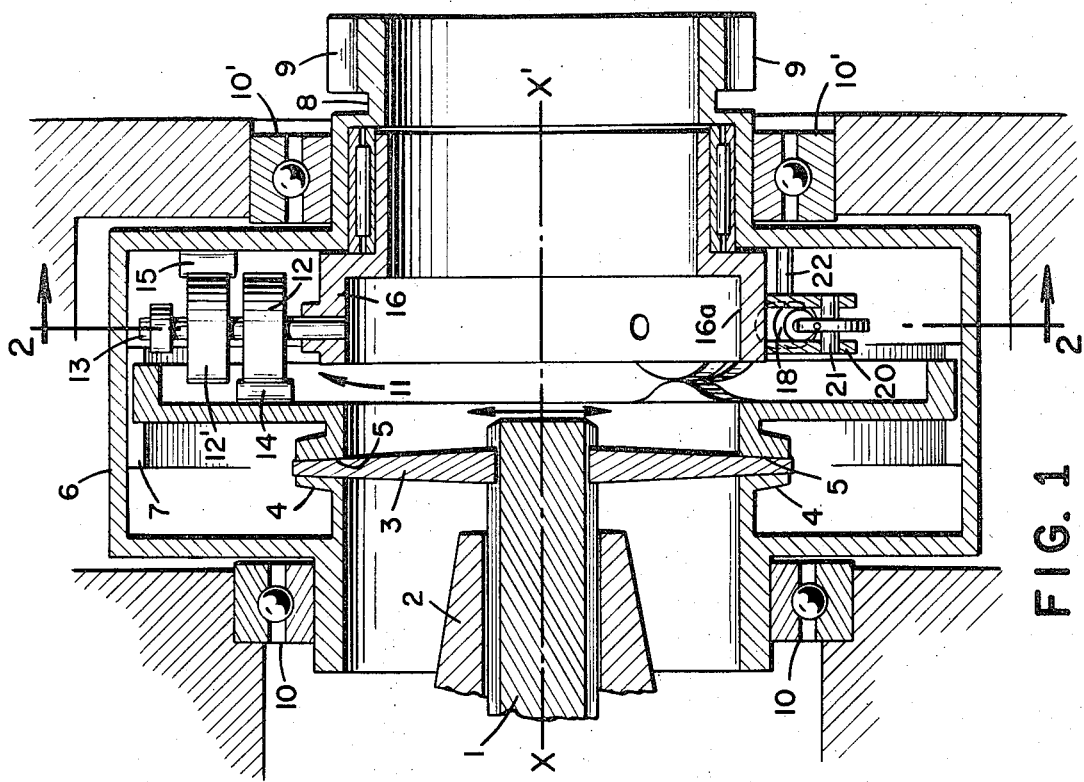

United States Patent [19]
Quemerais

[11] 3,812,943
[45] May 28, 1974

[54] CAM OPERATED FRICTION CLUTCH

[75] Inventor: Philippe Quemerais, Billancourt, France

[73] Assignees: Regie Nationale Des Usines Renault, Billancourt (Hauts de Seine); Automobiles Peugeot, Paris, both of, France

[22] Filed: Dec. 27, 1971

[21] Appl. No.: 211,955

[30] Foreign Application Priority Data
Jan. 12, 1971   France .............................. 71.00805

[52] U.S. Cl. ............ 192/93 A, 192/85 AA, 74/99 A
[51] Int. Cl. ......................................... F16d 25/063
[58] Field of Search .......... 192/93 A, 89 A, 105 CP, 192/70.23

[56] References Cited
UNITED STATES PATENTS

| | | | |
|---|---|---|---|
| 834,499 | 10/1906 | Sturtevant.................... | 192/70.23 X |
| 2,649,941 | 8/1953 | Doebeli......................... | 192/93 A X |
| 2,661,826 | 12/1953 | Hendrickson..................... | 192/93 A |
| 2,675,105 | 4/1954 | Kelley............................... | 192/93 A |
| 2,700,444 | 1/1955 | Ahlen.............................. | 192/93 A |

*Primary Examiner*—Benjamin W. Wyche
*Attorney, Agent, or Firm*—Richard K. Stevens

[57] ABSTRACT

Friction-type variable-speed transmission mechanism comprising internally tangent disk and rings, and more particularly at least one disk rigid with the input shaft and interposed between two friction rings rotatably solid with a driven drum, one of said rings being adapted to be moved in its axial direction under the control of a thrust device carrying reaction members distributed around a circumference external to the contact area between said disks and rings, characterized in that said thrust device comprises a plate carrying at least one shaft on which radially spaced rotary rollers are disposed and adapted rotatably to engage cam faces positioned on said movable ring and in said rotary drum, respectively, said plate being positioned angularly under the combined action of two antagonistic forces.

1 Claim, 2 Drawing Figures

PATENTED MAY 28 1974  3,812,943

CAM OPERATED FRICTION CLUTCH

The present invention relates in general to friction-type variable-speed transmissions and has specific reference to a transmission mechanism of this character which comprises male and female, internally-tangent tapered disks, and to the means for controlling the variation in the transmission ratio and the mutual driving engagement or clamping of the friction disks.

A disk-type variable-speed drive or transmission mechanism is already known wherein a set of disks is mounted on a central driving shaft, a set of rings being also disposed around said central shaft and adapted to slide in a drum rigid with another shaft parallel to said central shaft. In a variable-speed transmission of this character the inner edge of the rings constitute a contact surface adapted to engage the outer periphery of the disks and means are provided for varying the relative distance between the two shafts in order to modify as required the degree of penetration of said disks between the rings and therefore the speed ratio of the two shafts which is a direct function of the diameter of the circumference on which the points of contact between the disks and the edges of said rings lie momentarily.

On the other hand, it is known that an axial effort must be exerted for producing a drive between said disks and rings. To this end, a known proposition consisted in providing a central clamping device acting upon the sliding disks in order to force them back axially against a stop rigid with the central shaft by clamping the rings against one another through spring means, a fluid pressure or a cam face.

However, since the frictional contact between each disk and the relevant rings takes place at eccentric points, a similarly eccentric bearing reaction is developed which tends to impart an oblique position to said disks and rings, notably in the case of a device controlled by fluid pressure.

To avoid this inconvenience, variable-speed transmissions were proposed wherein the pressure devices are disposed at spaced angular intervals outside the annular area in which said contact between the disks and rings takes place. In this case the variable-speed transmission comprises a cam-type clamping device preventing the undesired inclination or tilting of the clamping plate rigid with the ring-supporting drum, since the action produced by the cam means is exerted on the outer periphery of the plate.

However, it will be seen that if the engine torque is reversed, for example when coasting is indulged in, in the case of a motor vehicle, a slight release of the disk clamping action may take place, before the proper clamping action thereof is restored under the control of a cam face angularly shifted in relation to the previously engaged cam face. Under these conditions it is clear that this repeated slip is a source of detrimental shocks and therefore of premature wear of the disks.

It is the primary object of this invention to avoid the inconveniences set forth hereinabove by providing a friction-type variable-speed transmission mechanism comprising at least one disk rigid with its input shaft and interposed between two friction rings rotatably solid with a driven drum, one of said rings being adapted to move axially under the control of a thrust device carrying reaction members distributed along a circumference externally of the contact area between the disks and rings of the transmission. This variable-speed transmission mechanism is characterized in that the thrust device comprises a plate having at least one shaft carrying radially spaced rotary rollers rolling on cam faces provided on the movable ring and in the rotary drum, respectively, to constitute two concentric contact surfaces located externally of said contact area between said disks and rings.

In a variable-speed mechanism thus constructed it is possible to provide one angular position of the thrust device for each relative position of the driving disk in relation to the driven rings, in order to reduce the effort necessary for modifying the output speed of the variable-speed transmission.

It will also be seen that with this arrangement any and each angular position of the device corresponds to a well-defined axial distance between the rings, thus permitting a more or less pronounced penetration of the driving disks between said rings.

Therefore, the disk clamping effort is obtained only by controlling the degree of penetration of the disks between the rings.

Figure 2:
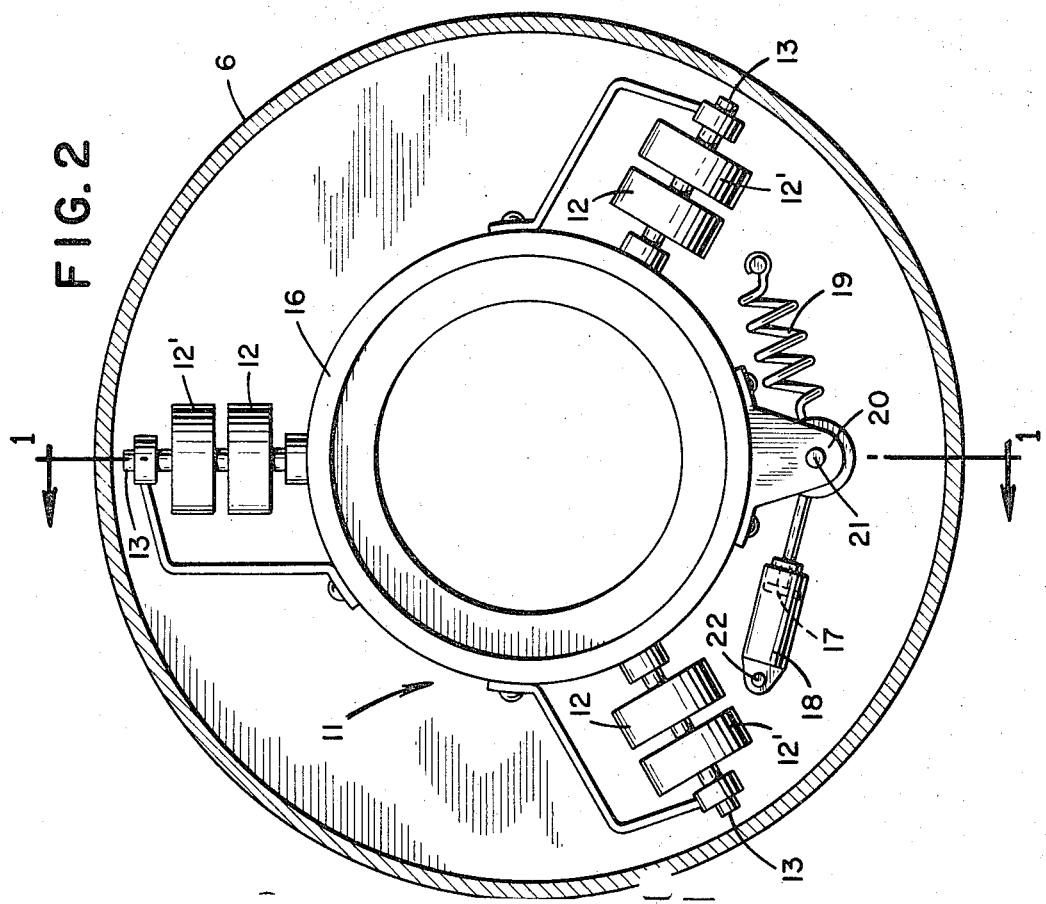

Other features and characteristics of this invention will appear as the following description proceeds with reference to the accompanying drawing illustrating diagrammatically by way of example a simplified form of embodiment of a mechanism constructed according to the teachings of the invention. In the drawing:

FIG. 1 is a diagrammatic illustration of one portion of the variable speed transmission mechanism shown in longitudinal section, and FIG. 2 is a fragmentary section taken along the line II—II of FIG. 1.

The variable-speed transmission mechanism illustrated in FIG. 1 is more particularly of the type disclosed in the U.S. Pat. application No. 11,585 of Feb. 16, 1970, now Patent No. 3,621,734.

As shown in FIG. 1, the input shaft 1 of the transmission mechanism is rotatably mounted in the casing 2 with the interposition of bearings (not shown). This input shaft 1 carries a biconical disk 3 made or lined preferably with a material having a low coefficient of wear.

This disk 3 is mounted through splines on shaft 1 and is locked against axial movement in relation thereto by any suitable and known clamping or tightening means.

Co-acting with this disk 3 are a pair of rings 4 and 5 disposed on either side of the disk and provided with friction surfaces adapted to conform to the disk surfaces. The rings 4 and 5 are rotatably rigid with a rotary driven drum 6. The ring 4 is also axially rigid with the drum 6, and ring 5 is connected through splines 7 to said drum 6.

The drum 6 has a concentric cylindrical extension 8 formed with teeth 9 and is rotatably mounted in bearings 10, 10' of the transmission casing (not shown). Ring 5 is adapted to move axially in splines 7 under the control of a thrust device designated generally by the reference numeral 11.

This device is rotatably mounted about the axis of rotation XX' of input shaft 1 and carries pressure members such as 12, 12'. These pressure members 12, 12' may comprise for instance rollers rotatably mounted in turn on three shafts 13 shifted angularly (only one of these shafts 13 being illustrated diagrammatically in FIG. 2). The radial spacing of these members 12, 12' is such that the circumferential path described by these members lies constantly outside the area of contact between the relevant disk 3 and rings 4 and 5.

The aforesaid rollers 12, 12' are radially spaced from each other and in rolling engagement with corresponding cam faces formed on insert members 14 and 15, respectively. These cam members are disposed the one on the shiftable ring 5 and the other in the rotary drum 6. The angularly spaced shafts 13 are rigid with a pivotally mounted plate 16 the angular position of which is set by the combined action of two antagonistic forces.

It will be noted that in a first stage, to obtain a change in the transmission ratio, the plate 16 is pivoted by using in the known fashion the force of compressed hydraulic fluid acting on a piston 17 of a cylinder 18 rigid with the casing of the mechanism, against the return force of a spring 19. A proper value of the fluid pressure may be obtained by resorting to an automatic governor of the type described in the French Patent No. 1,232,550. The pivotal movement of plate 16 permits of selecting the output speed of the variable-speed transmission.

In a second stage, the axis of rotation XX' and disk 3 are pivoted in order to modify the contact area between said disk 3 and its companion rings 4 and 5. The means for pivoting the shaft 1 may consist for example of the device disclosed and illustrated in the above-mentioned U.S. Pat. application.

Of course, various modifications and variations may be brought in the practical actuation of the variable-speed friction-type transmission mechanism described hereinabove and illustrated in the attached drawing by way of example, without inasmuch departing from the basic principle of the invention as set forth in the appended claim.

What is claimed as new is:

1. Friction-type variable-speed transmission mechanism comprising a driving shaft having at least a first disk means thereon, a driven member including a drum having a second disk means fixed thereto, third disk means splined to the drum for axial movement relative to the second disk means, a ring carried by the drum, a plurality of radially extending pins carried on the ring and extending radially outwardly therefrom, at least two radially spaced rollers journalled on each pin with said rollers located radially outward of said second and third disk means, cam means carried adjacent the rollers on at least one of said second disk means and said drum, and actuator means connected between the drum and the ring for selectively moving the ring and rollers circumferentially relative to the drum and cams whereby all said disks are frictionally engaged to drive the driven drum.

* * * * *